Nov. 28, 1961     W. SCHENK ET AL     3,010,802
APPARATUS FOR THE CONTINUOUS REACTION OF SOLID MATERIALS
Filed March 5, 1957
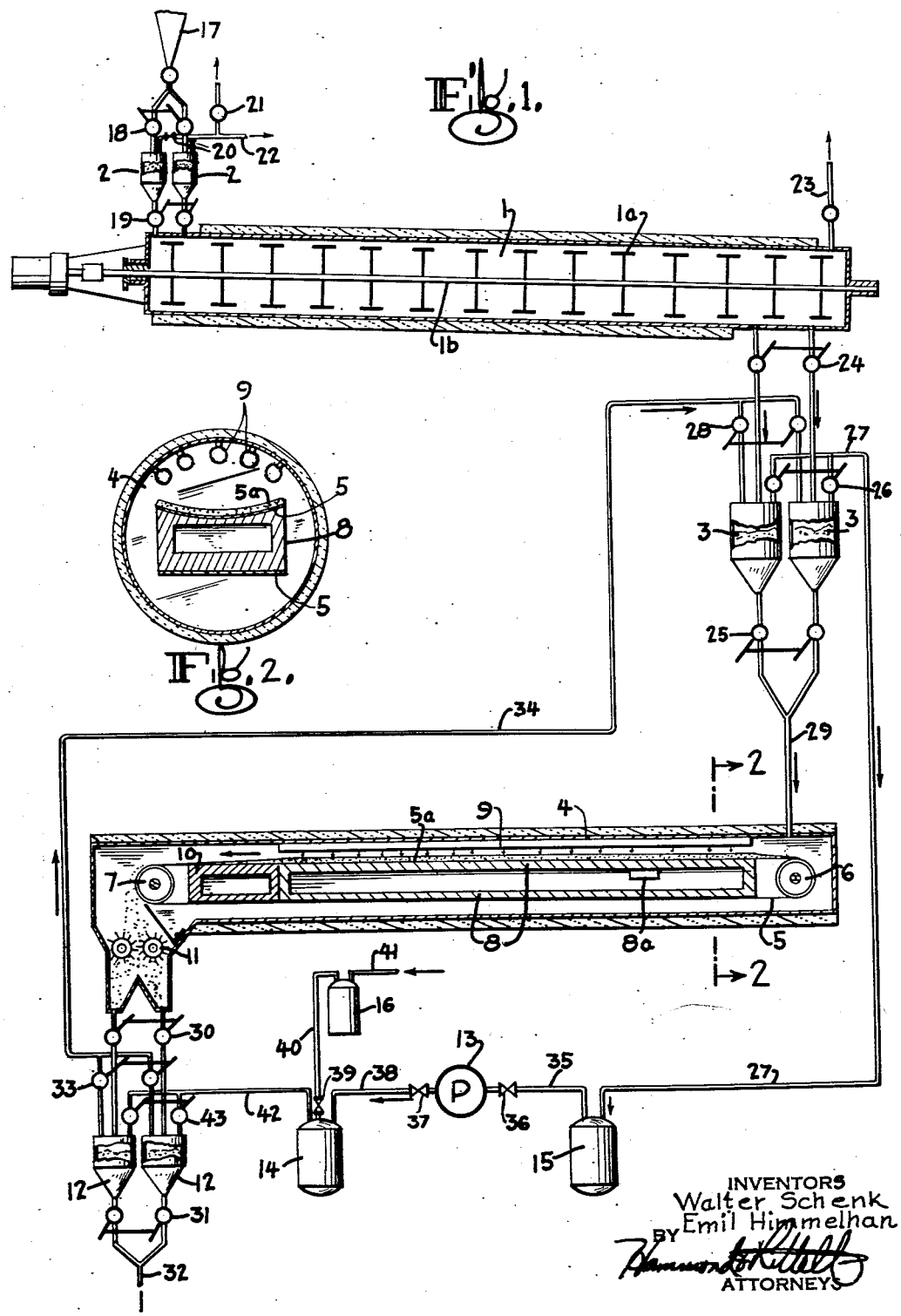
INVENTORS
Walter Schenk
Emil Himmelhan
BY
ATTORNEYS

3,010,802
APPARATUS FOR THE CONTINUOUS REACTION OF SOLID MATERIALS

Walter Schenk and Emil Himmelhan, Heidelberg, Germany, assignors to Henkel & Cie, G.m.b.H., Dusseldorf-Holthausen, Germany, a corporation of Germany
Filed Mar. 5, 1957, Ser. No. 644,073
Claims priority, application Germany Mar. 6, 1956
6 Claims. (Cl. 23—262)

This invention relates to thermal reactions of chemical compounds wherein the compounds reacted are handled in a solid state throughout the process, and treated and recovered in the solid state. The invention more particularly relates to an apparatus for carrying out such chemical reactions in a continuous manner.

It is known that in the continuous reaction or transformation of solid materials in a heated reaction chamber which is closed off from the atmosphere and which may be pressure tight, the movement of the reaction mixture through the chamber presents considerable difficulties. This is particularly true when intermixing or stirring of the solid material must be avoided in order to obtain high yields, or if during the reaction or transformation at elevated temperatures the reaction mixture melts and then cakes, as is the case for example in the transformation of potassium phthalate into potassium terephthalate. Because of these difficulties, such reactions have generally been carried out in discontinuous fashion, that is, as batch reactions.

It is an object of this invention to carry out thermal reactions with chemical compounds, which tend to fuse and cake at the reaction temperature, in the solid phase in a continuous manner.

It is a further object of this invention to present an apparatus for conducting the continuous thermal transformation and reaction of solid materials at temperatures near their fusion temperature.

Another object is to provide an apparatus to which solid chemical compounds may be continuously added, continuously transformed or reacted under heat and the reaction products may be continuously withdrawn.

These and other objects and advantages of our invention will become apparent as the description proceeds.

We have found that these objects may be accomplished and the above disadvantages may be overcome by the use of our invention. We have now found that the reaction or transformation of solid materials at elevated temperatures near the fusion temperature of the materials, may be carried out continuously in a sealed, pressure-tight reaction chamber, and under superatmospheric or vacuum conditions, if this reaction chamber is provided with a moving, heat-resistant endless conveyor belt, which may if desired, be oscillated with the aid of a vibrator. The reaction mixture is deposited on the endless belt, is passed through a heating or reaction zone, and if desired, through a cooling zone, formed by dividing the reaction chamber into two sections. The reacted materials are then discharged from the moving belt at the return point, possibly by means of a conveyor belt extension, into a comminuting device which is built into the reaction chamber, through which the material emerges from the reaction chamber by passing through pressure lock-hoppers or screw conveyors.

By the use of such apparatus, it is possible to pass solid materials through a heated reaction chamber and withdraw the reacted materials from the chamber without interruption, even when using materials which tend to sinter or cake during the reaction or transformation. The introduction and withdrawal of the solid material into and from the reaction chamber is accomplished in a manner well known for this purpose. In many cases it is necessary to employ the solid materials in a dry form and to avoid the admission of air and/or atmospheric moisture.

This may be accomplished by first passing the moist reaction materials through a dryer such as a vacuum dryer and then passing the dried material, directly and continuously, through lock-hoppers into the reaction chamber while excluding the admission of air from the apparatus.

The drawings illustrate preferred embodiments of our apparatus.

FIGURE 1 is a part sectional elevation of the apparatus of our invention.

FIGURE 2 is a cross-sectional view of the reaction chamber taken along the line 2—2 of FIGURE 1.

Referring to FIGURE 1, the material to be reacted, such as for example, potassium phthalate, is continuously dried in a suitable drying apparatus 1 which operates at reduced pressure, here represented as a dryer having rotary blades 1a mounted on a rotary shaft 1b. The reaction material is withdrawn from storage hopper 17 through the lines containing valves 18, passes into lock hoppers 2 and from there it is introduced through lines containing valves 19 into dryer 1. Lock hoppers 2 operate as pressure seals and gas may be introduced or removed from these hoppers through valves 20 and 21 and line 22.

The reaction material passes through dryer 1 and leaves the dryer through the lines containing valves 24, passes through lock hoppers 3 and from there through the lines containing valves 25 then through line 29 into reaction chamber 4 where it is deposited on endless conveyor belt system 5 which travels over pulleys 6 and 7. The inlet and outlet valves 18, 19, 24 and 25 for lock hoppers 2 and 3 may be so interconnected that one hopper 2 may be discharging while the other is being filled and likewise for hoppers 3. Conveyor belt 5 passes over a table-like base 8. Base 8 may be advantageously concave in cross sections (as shown on FIGURE 2) so than the endless conveyor belt is troughed, allowing the belt to carry more material. Base 8 may also contain idler rollers to facilitate belt travel. Conveyor belt 5 may be oscillated by means of vibrator 8a.

The reaction mixture travels through chamber 4, as a layer of solids 5a, on belt 5 in the direction from pulley 6 to 7. Heat is supplied to the reaction mixture by means of heater 9 which is mounted in the reaction chamber. An infra red heater has been found to be particularly suitable for this purpose. However, other suitable means may also be used. For example, the heat may be supplied from outside by the use of electrical means. The heat may also be introduced with the reaction mixture itself or with heated gases, such as carbon dioxide or other inert gases. In addition, the table of base 8 may also be provided with heating means.

It is particularly advantageous that the heating means do not extend the entire length of the belt but terminate a short distance in front of the return pulley 7 and that the last part of the table base 10 and return pulley 7 be cooled. This may be accomplished with the aid of water, cooling brines or air circulating through the hollow cooling table 10. By cooling the molten mass at return pulley 7 and by providing table-like base 10 with a flat surface whereby the conveyor belt is arched up from its troughed position to a flat position, the caked reaction mass is caused to break up and easily falls off the conveyor belt into a comminuting means 11. The comminuting apparatus may be of any suitable type. The comminuted reaction product falls into a hopper section of the reaction chamber and from there is discharged through the lines containing valves 30 into lock hoppers 12 then through the lines containing valves 31 from where it may be withdrawn through line 32 for further processing or storage by means of interlocked valves as indicated.

By the use of this apparatus, the reaction or transformation of solid materials may be carried out also in the presence of gases and under pressure. In this case, it is advantageous to provide pressure equalizing vessels 14 and 15 which connect the lock hoppers with each other so that a steady gas stream under a pre-determined pressure is created when the gas circulation pump 13 is interposed into the circuit. To replace gas losses, fresh gas may be introduced through lines 41, pressure vessel 16, line 40 and valve 39 to vessel 14.

In the complete gas circuit starting with vessel 14, gas flows from vessel 14 through line 42 and valves 43 into lock hoppers 12. Gas flows from lock hoppers 12 through valves 33, line 34 and valves 28 into lock hoppers 3. Gas leaves lock hoppers 3 through valves 26, flows through line 27 into vessel 15, then through line 35. Gas flows through one-way valve 36, pump 13, one-way valve 37, line 38 and again reaches the vessel 14. Thus, the gas circuit is closed and by the use of valves 25 and 30 at opposite ends of the reaction chamber, the gas pressure in the reaction chamber may be controlled.

The endless conveyor belt which moves the reaction mixture through the reaction chamber is composed of a heat-resistant steel of any suitable construction which may be a flat ribbon or a linked construction or the like. By means of the concave shape of table base 8, the conveyor belt is given a troughed form so that it can hold more of the reaction mixture. However, care must be taken that the reaction mixture is uniformly distributed on the conveyor belt. This may be accomplished by means of a swinging scraper or a chain system. The thickness of the reaction mixture on the conveyor belt should be preferably from 2 to 20 cm. In order to facilitate the discharge of the cake mass from the conveyor belt, the last section 10 of table base 8 at return pulley 7 is flat which flattens out the troughed belt and causes the reaction mass to break up.

The apparatus is particularly suited for the transformation, isomerization or decarboxylation of salts of cyclic carboxylic acids; for example, of alkali metal or thallium salts of benzoic acid, phthalic acid, isophthalic acid or benzoic carboxylic acids with 3 or more carboxyl groups, as well as of heterocyclic carboxylic acids. These reactions are, as is well known, carried out at temperatures of about 400° C. and at elevated pressure, preferably in the presence of catalysts and advantageously with simultaneous introduction of gases, such as carbon dioxide, admixed, if desired, with nitrogen or other inert gases. Among the products formed thereby, the salts of terephthalic acid are of particular industrial importance. The apparatus may also be employed with advantage for the transformation of salts of naphthalene carboxylic acids—for example of 2-hydroxynaphthalene-1-carboxylic acid—into salts of 2-hydroxynaphthalene-3-carboxylic acid, or for the transformation of salicyclic acid into p-hydroxybenzoic acid. Also, the production of hydroxybenzene carboxylic acids from phenolates and carbon dioxide may be carried out continuously in the above-described apparatus.

While we have set forth certain specific embodiments and preferred modes of operation for the practice of our invention, it will be understood that we do not intend to be limited thereby and that various modifications may be made in our invention without departing from the spirit thereof and the scope of the following claims.

We claim:

1. An apparatus for the continuous reaction and transformation at elevated temperatures of solid chemical compounds which tend to fuse and cake at the reaction temperature, comprising a substantially horizontal cylindrical pressure-tight reaction chamber containing a heating zone and a cooling zone, said heating zone occupying a major part of said chamber, an endless conveyor belt moving in a substantially horizontal direction over pulleys adjacent each end and within said reaction chamber, a table-like base disposed horizontally within said reaction chamber over which said endless belt moves, heating means adjacent to said endless belt, and disposed horizontally along the length of said heating zone, means at one end of said reaction chamber for introducing solid reaction materials on to said endless belt in said heating zone, cooling means in said cooling zone, comminuting means at the opposite end of said reaction chamber from said introducing means, said comminuting means being disposed below the return pulley of said endless belt in a position to receive material discharged from said cooling zone, hopper means below said comminuting means and means for withdrawing comminuted reaction products.

2. An apparatus for the continuous reaction and transformation at elevated temperatures of solid chemical compounds which tend to fuse and cake at the reaction temperature, comprising a substantially horizontal cylindrical pressure-tight reaction chamber, containing a heating zone at the receiving end and a cooling zone at the discharge end, said heating zone occupying a major part of the length of said chamber, an endless conveyor belt moving in a substantially horizontal direction over pulleys adjacent each end and within said reaction chamber, a table-like base disposed horizontally within said reaction chamber over which said endless belt moves, heating means adjacent to said endless belt and disposed horizontally along the length of said belt, means at the receiving end of said reaction chamber for introducing solid reaction materials on to said endless belt, comminuting means at the discharge end of said reaction chamber, said comminuting means being disposed below the return pulley of said endless belt, and screw conveyor means for withdrawing comminuted reaction products from the discharge end of said reaction chamber.

3. An apparatus for the continuous reaction and transformation at elevated temperatures of solid chemical compounds which tend to fuse and cake at the reaction temperature, comprising a substantially horizontal cylindrical pressure-tight reaction chamber containing a heating zone at the receiving end and a cooling zone at the discharge end, said heating zone extending a major part of the length of said chamber, an endless heat-resistant conveyor belt moving in a substantially horizontal direction within said reaction chamber over pulleys adjacent each end and within said reaction chamber, vibrating means for oscillating said belt, a table-like base disposed horizontally within said reaction chamber over which said endless belt moves, said base being troughed at the receiving end, heating means adjacent to said endless belt and disposed horizontally along the length of said heating zone, means at the receiving end of said reaction chamber for introducing solid reaction materials on to said endless belt in said heating zone, comminuting means at the opposite end of said reaction chamber from said introducing means, said comminuting means being disposed below the return pulley of said endless belt in a position to receive material discharged from said cooling zone, hopper means below said comminuting means, said hopper means being an integral part of said reaction chamber, and means at the discharge end for withdrawing comminuted reaction products from said reaction chamber.

4. An apparatus for the continuous reaction and transformation of solid salts of cyclic carboxylic acids, said salts being selected from the group consisting of alkali metal and thallium salts at elevated temperatures comprising a substantially horizontal cylindrical pressure-tight reaction chamber containing a heating zone said heating zone occupying a major part of said chamber and a cooling zone, an endless conveyor belt moving in a substantially horizontal direction over pulleys adjacent each end and within said reaction chamber, a table-like base disposed horizontally within said reaction chamber over which said endless belt moves, heating means adjacent to said endless belt, and disposed horizontally along the length of said heating zone, means at one end of said reaction chamber for introducing solid reaction materials on to said endless belt in said heating zone, cooling means in said cooling zone, comminuting means at the opposite end of said reaction chamber from said introducing means, said comminuting means being disposed below the return pulley of said endless belt in a position to receive material discharged from said cooling zone, hopper means below said comminuting means and means for withdrawing comminuted reaction products.

5. An apparatus for the continuous reaction and transformation of solid salts of cyclic carboxylic acids, said salts being selected from the group consisting of alkali metal and thallium salts at elevated temperatures comprising a substantially horizontal cylindrical pressure-tight reaction chamber, containing a heating zone at the receiving end and a cooling zone at the discharge end, said heating zone occupying a major part of the length of said chamber, an endless conveyor belt moving in a substantially horizontal direction over pulleys adjacent each end and within said reaction chamber, a table-like base disposed horizontally within said reaction chamber over which said endless belt moves, heating means adjacent to said endless belt and disposed horizontally along the length of said belt, means at the receiving end of said reaction chamber for introducing solid reaction materials on to said endless belt, comminuting means at the discharge end of said reaction chamber, said comminuting means being disposed below the return pulley of said endless belt, and screw conveyor means for withdrawing comminuted reaction products from the discharge end of said reaction chamber.

6. An apparatus for the continuous reaction and transformation of solid salts of cyclic carboxylic acids, said salts being selected from the group consisting of alkali metal and thallium salts at elevated temperatures comprising a substantially horizontal cylindrical pressure-tight reaction chamber containing a heating zone at the receiving end and a cooling zone at the discharge end, said heating zone extending a major part of the length of said chamber, an endless heat-resistant conveyor belt moving in a substantially horizontal direction within said reaction chamber over pulleys adjacent each end and within said reaction chamber, vibrating means for oscillating said belt, a table-like base disposed horizontally within said reaction chamber over which said endless belt moves, said base being troughed at the receiving end, heating means adjacent to said endless belt and disposed horizontally along the length of said heating zone, means at the receiving end of said reaction chamber for introducing solid reaction materials on to said endlesse belt in said heating zone, comminuting means at the opposite end of said reaction chamber from said introducing means, said comminuting means being disposed below the return pulley of said endless belt in a position to receive material discharged from said cooling zone, hopper means below said comminuting means, said hopper means being an integral part of said reaction chamber, and means at the discharge end for withdrawing comminuted reaction products from said reaction chamber.

References Cited in the file of this patent
UNITED STATES PATENTS

| | | |
|---|---|---|
| 1,322,652 | Testrup | Nov. 25, 1919 |
| 1,512,419 | Gray | Oct. 21, 1924 |
| 1,520,831 | McAfee | Dec. 30, 1924 |
| 2,157,716 | Muller | May 9, 1939 |
| 2,671,969 | Mayer | Mar. 16, 1954 |

FOREIGN PATENTS

| | | |
|---|---|---|
| 522,829 | Belgium | Dec. 9, 1955 |
| 747,204 | Great Britain | Mar. 28, 1956 |